United States Patent

Jeon

[11] Patent Number: 5,999,511
[45] Date of Patent: Dec. 7, 1999

[54] READ CIRCUIT FOR DISC PLAYER

[75] Inventor: Ki Jeon, Seoul, Rep. of Korea

[73] Assignee: LG Semicon Co., Ltd., Cheongju, Rep. of Korea

[21] Appl. No.: 09/143,689

[22] Filed: Sep. 3, 1998

[30] Foreign Application Priority Data

Dec. 20, 1997 [KR] Rep. of Korea ..................... 97-71264

[51] Int. Cl.$^6$ .................................................. G11B 5/00
[52] U.S. Cl. ............................... 369/124; 369/48; 369/59
[58] Field of Search ............................... 369/59, 48, 124; 370/120; 455/161.2; 360/51, 78.14, 78.04, 65.46

[56] References Cited

U.S. PATENT DOCUMENTS

| | | | |
|---|---|---|---|
| 5,278,837 | 1/1994 | Kelley | 370/120 |
| 5,414,571 | 5/1995 | Matsushige et al. | 360/65 |
| 5,675,569 | 10/1997 | Yamaguchi et al. | 369/124 |
| 5,701,598 | 12/1997 | Atkinson | 455/161.2 |
| 5,838,512 | 11/1998 | Okazaki | 360/51 |

*Primary Examiner*—Tan Dinh
*Assistant Examiner*—Kim-Kwok Chu
*Attorney, Agent, or Firm*—Fleshner & Kim

[57] ABSTRACT

A read circuit for a disc player or the like is provided that can achieve a high-speed data recovery, which can be varied by increasing only a clock speed. The read circuit can include a control signal generating unit receiving a radio frequency signal detected from a disc and outputting first and second control signals to an external circuit and outputting first and second output signals. A level compensating unit receives the first output signal from the control signal generating unit and feeds back a level compensation control signal to the control signal generating unit. A gain compensating unit receives the second output signal from the control signal generating unit to feed back a gain compensation control signal to the control signal generating unit to compensate a gain of the control signal generating unit. A timing control unit receives the second output signal from the control signal generating unit and feeds back a timing control signal to the control signal generating unit.

17 Claims, 2 Drawing Sheets

READ CIRCUIT FOR DISC PLAYER

BACKGROUND OF THE INVENTION

1. Field of the Invention

The present invention relates to a read circuit, and more particularly, to a read circuit for data signals recorded/ reproduced in a disc player or the like.

2. Background of the Related Art

When a laser beam is scanned onto a disc such as CD, DVD or the like, a disc player converts reflected optical signals to electric signals using a photo sensor. When the photo sensor is divided into 4 sections, the disc player amplifies an output voltage in each of the sections by a preamp. The disc player inputs a radio frequency signal RFSUM in which the amplified signals are superimposed or compounded to a circuit for a radio frequency process. In the radio frequency process circuit, the output signal is restored through a DSP, a decoder, ect., to be displayed on a screen of a display apparatus or recovered as a sound by an audio player.

FIG. 1 is a block diagram showing a read circuit of a related art disc player. As shown in FIG. 1, the read circuit is composed of an automatic gain control (AGC) unit 1 outputting a radio frequency signal RFOUT at a predetermined level, an analog equalizer 2 receiving an output signal from the AGC unit 1 and compensating radio frequency attenuation effects and a 6 bit A/D converter 3 converting an output analog signal EQOUT from the equalizer 2 to a digital signal. A level compensating unit 4 obtains a mid value of the output signal EQOUT from the equalizer 2 and compares the value to a predetermined reference value VCM to adjust a level of a mid value of the output signal RFOUT from the AGC unit 1. A gain compensating unit 5 obtains and compares a peak value of the output signal EQOUT from the equalizer 2 to a predetermined reference value Vpeak to adjust a gain of the AGC unit 1. A timing control unit 6 detects a speed of an output signal Dout from the A/D converter 3 and controls a sampling time of the A/D converter 3.

The level compensating unit 4 is composed of an integral circuit 4-1, which includes a resistor R11 and a capacitor C11, that obtains a mid value of the output signal EQOUT of the equalizer 2 and a comparator AMP11. The comparator AMP11 compares an output signal from the integral circuit 4-1 and the reference value VCM. The comparator AMP11 adjusts a level of the mid value of the output signal RFOUT from the AGC unit 1 in accordance with the compared result.

The gain compensating unit 5 is composed of a peak value detector 5-1 detecting a peak value of the output signal EQOUT from the equalizer 2, a capacitor C12 and a comparator AMP12. The comparator AMP12 adjusts an amplification gain of the AGC unit 1 by comparing an output value from the peak value detector 5-1 to the reference peak value VPEAK and the capacitor C12 stabilizes an output from the comparator AMP12.

The timing control unit 6 is composed of a timing detector 6-1, a low-pass filter 6-2 and a voltage control oscillator 6-3. The timing detector 6-1 detects a frequency of the output signal Dout from the A/D converter 3 and outputs a control signal PU/PD in accordance with the result. The low-pass filter 6-2 converts the output signal PU/PD from the timing detector 6-1 to a direct current voltage. The voltage control oscillator 6-3 is controlled by the direct current voltage from the low-pass filter 6-2 to transmit a sampling clock signal SCLK to the A/D converter 3.

The operation of related art read circuit for the disc player will now be described. First, the radio frequency signal RFSUM is amplified in the AGC unit 1 and outputted as the signal RFOUT at a predetermined level. The output signal RFOUT from the AGC unit 1 is inputted to the equalizer 2 and also inputted to a servo block (not shown) for tracking and focusing control. The equalizer 2 receives the output signal RFOUT and compensates the frequency change. The A/D converter 3 converts the compensated signal EQOUT from the equalizer 2 to a digital signal Dout. As shown in FIG. 2, the equalizer 2 is an analog circuit configured filter with a gain characteristic that is flat in a low frequency range and boosted in a particular frequency range. The gain characteristic is boosted in the particular frequency range to compensate radio frequency effects or elements of 4 electric signals converted in the pickup unit that are attenuated when inputted to the circuit. The frequency and boost characters of the equalizer 2 are controlled by an externally input coefficient data K.

In the level compensating unit 4, the integral circuit 4-1 is composed of the resistor R11 and the capacitor C11. When the integral circuit 4-1 detects the mid value of the output signal EQOUT from the equalizer 2, the comparator AMP11 compares the detected mid value to the predetermined reference value VCM to output the comparison result to the AGC unit 1. When the reference value VCM is larger than the mid value of the output signal EQOUT from the equalizer 2, the mid value of the output signal RFOUT from the AGC unit 1 is increased. When the reference value VCM is smaller than the mid value of the output signal EQOUT, the mid value of the output signal RFOUT from the AGC unit 1 is decreased.

By having the mid value of the output signal EQOUT from the equalizer 2 become the reference value VCM, offsets of a number of amplifiers provided in the AGC unit 1 and the equalizer 2 are eliminated. The capacitor C11 is provided to maintain the stability of a negative feedback loop formed of the AGC unit 1, the equalizer 2 and the level compensating unit 4.

In the gain compensating unit 5, the peak value detector 5-1 detects a peak value of the output signal EQOUT from the equalizer 2. The comparator AMP12 compares the output signal EQOUT peak value to the predetermined peak value VPEAK and outputs the comparison result to the AGC unit 1.

When the reference value VPEAK is larger than the peak value of the output signal EQOUT from the equalizer 2, the gain compensating unit 5 increases the gain magnitude of the AGC unit 1. When the reference value VPEAK is smaller than the peak value of the output signal EQOUT, the gain compensating unit 5 decreases the gain magnitude of the AGC unit 1. Accordingly, the AGC unit 1 amplifies the radio frequency signal RFSUM and outputs the signal RFOUT at a constant level.

The capacitor C12 connected with an output terminal of the comparator AMP12 and has a capacity of a few $\mu F$. The capacitor C12 is used to maintain the stability of the negative feedback loop of the AGC unit 1, the equalizer 2 and the gain compensating unit 5.

In the timing control unit 6, the timing detector 6-1, the low-pass filter. 6-2 and the voltage control oscillator 6-3 constitute a PLL loop to supply a sampling clock SCLK to the A/D converter 3. The timing detector 6-1 of the timing control unit 6 determines whether a phase of the output signal Dout of the A/D converter 3 is rapid or slow so that the A/D converter 3 may perform a sampling operation with an accurate sampling time at the peak value of the output signal EQOUT of the analog equalizer 2. Thus, the timing detector 6-1 outputs the control signal PU/PD to control the phase of the output signal Dout of the A/D converter 3. The low-pass filter 6-2 outputs a voltage, which is proportional to the signal PU/PD, to the voltage control oscillator 6-3. Thus, the voltage control oscillator 6-3, which is controlled by the voltage supplied from the low-pass filter 6-2, controls the speed of an oscillator frequency and maintains a constant frequency, for example 240 MHz. Thus, the timing control unit 6 modulates a sampling frequency and a phase of the A/D converter 3 to obtain the accurate sampling timing.

As described above, the related art read circuit has various problems. In the related art read circuit of the disc player, the analog equalizer 2 consumes a great deal of power and the power consumption increases as data recovery speed increases, which makes embodying a theoretical characteristic of the analog equalizer 2 difficult. For example, currently over 1W of electric power is consumed to achieve 3x of data recovery speed. Thus, the analog equalizer is difficult to use in a data recovery speed of 4x.

The above references are incorporated by reference herein where appropriate for appropriate teachings of additional or alternative details, features and/or technical background.

SUMMARY OF THE INVENTION

An object of the present invention is to provide a read circuit that substantially overcomes one or more of the problems and disadvantages caused by limitations of the related art.

An object of the present invention is to provide a read circuit for optical signals that reduces power consumption.

Another object of the present invention is to provide a read circuit that is applicable to a high-speed data recovery apparatus.

Another object of the present invention is to provide a read circuit equipped with an adaptive digital equalizer applicable to a reduced power high-speed data recovery apparatus. To achieve at least the above objects, in a whole or in parts, there is provided a read circuit for a disc player according to the present invention that includes an automatic gain control unit amplifying a detected radio frequency signal and outputting a signal at a predetermined level, a low-pass filter reducing a bandwidth of the signal outputted from the automatic gain control unit below a sampling frequency to prevent signal spectrums from being superposed, an analog-to-digital (AD) converter converting an output signal from the low-pass filter to a digital signal, a digital equalizer receiving an output signal from the A/D converter and compensating radio frequency attenuation elements, a level compensating unit compensating a mid value of the output signal from the automatic gain control unit so that the output signal from the AD converter becomes a predetermined voltage level, a gain compensating unit adjusting a gain of the automatic gain control unit so a swing peak value of an output signal from the digital equalizer to a prescribed level, and a timing control unit detecting a phase of the output signal from the digital equalizer and, in accordance with a detection result, adjusting a sampling frequency of the AD converter.

To further achieve at least the above objects, in a whole or in parts, there is provided a read circuit for a disc player according to the present invention that includes a control signal generating unit that receives an input signal and outputs first and second output signals, wherein the control signal generating unit comprises an adaptive equalizer that receives the first output signal, a level compensating unit that receives the first output signal and feeds back a level compensation control signal to the control signal generating unit, a gain compensating unit that receives the second output signal from the control signal generating unit and feeds back a gain compensation control signal to the control signal generating unit; and a timing control unit that receives the second output signal from the control signal generating unit and feeds back a timing control signal to the control signal generating unit, wherein the equalizer operates at a variable speed based on the timing signal.

To further achieve at least the above objects, in a whole or in parts, there is provided a read circuit for a disc player according to the present invention that includes a control signal generating unit that receives an input signal and outputs first and second control signals and first and second output signals, a level compensating unit that receives the first output signal and feeds back a level compensation control signal to the control signal generating unit, a gain compensating unit that receives the second output signal from the control signal generating unit and feeds back a gain compensation control signal to the control signal generating unit and a timing control unit that receives the second output signal from the control signal generating unit and feeds back a timing control signal to the control signal generating unit, wherein the control signal generating unit includes an automatic gain controller that adjusts the input signal and the level compensation control signal from the level compensating unit based on the gain compensation control signal to output the first control signal at a prescribed level, a low-pass filter that outputs the second control signal by reducing a bandwidth of the first control signal below that of the timing control signal, an analog-to-digital converter that converts the second control signal to the first output digital signal, and an equalizer that receives the first output signal from the ADC and outputs the second output signal, wherein the equalizer operates at a variable speed based on the timing signal, and wherein the equalizer is controlled by the timing control signal and an input coefficient data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
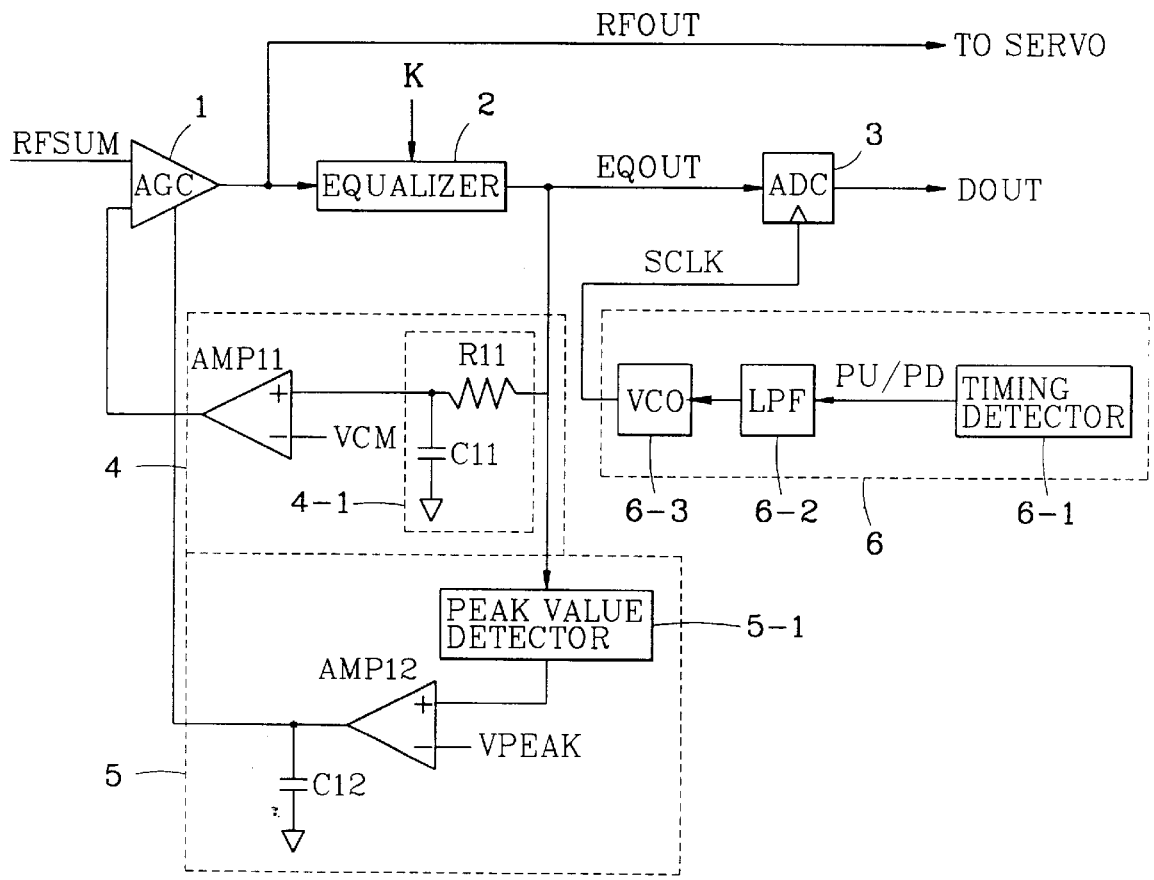
FIG. 1 is a diagram showing a block diagram of a read circuit for a related art disc player.
Figure 2:
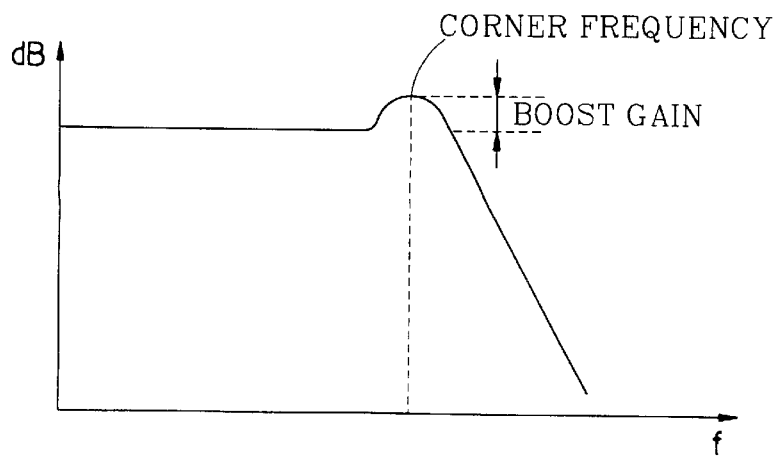
FIG. 2 is a diagram showing a wave form of a characteristic of an equalizer of FIG. 1.
Figure 3:
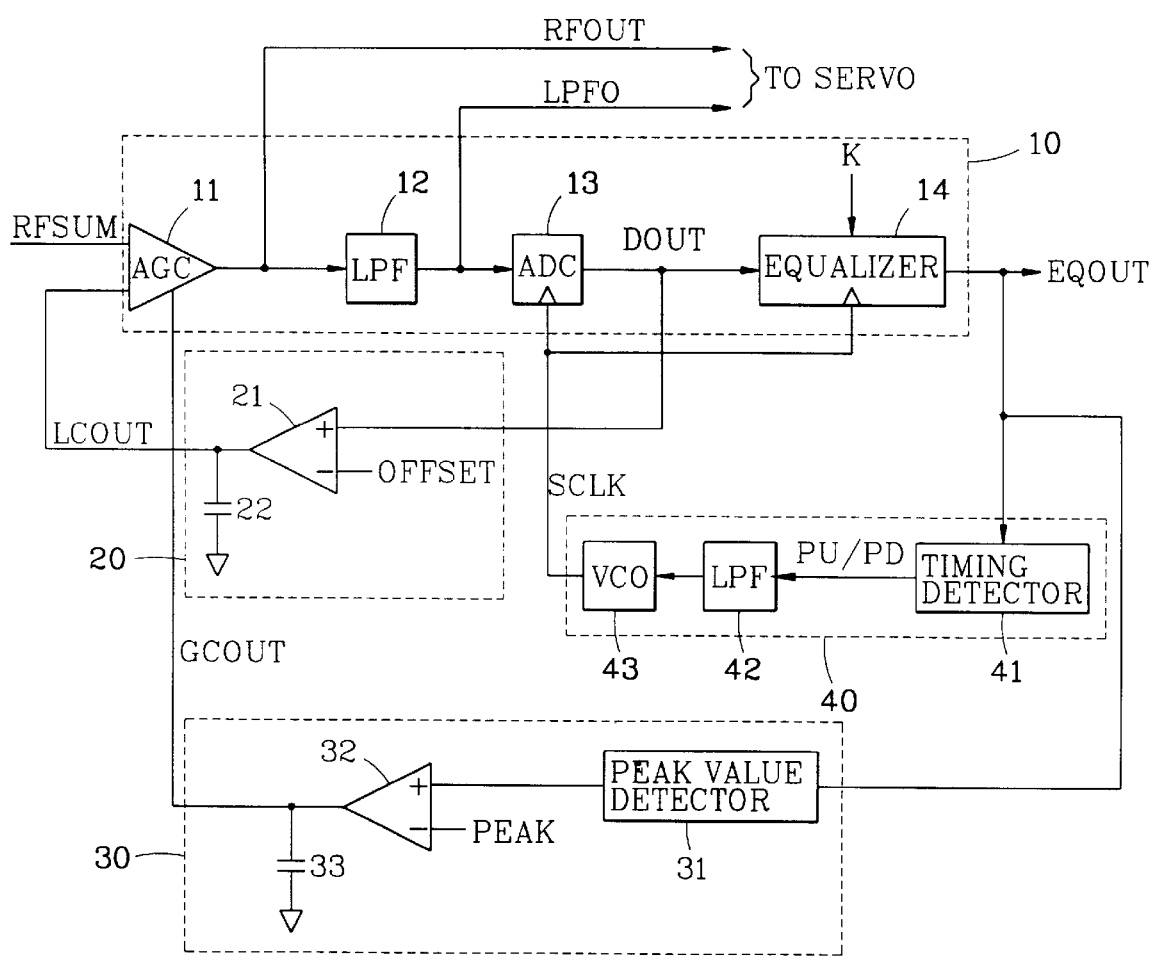
FIG. 3 is a block diagram showing a preferred embodiment of a read circuit according to the present invention.

FIG. 3 is a diagram that illustrates a preferred embodiment of read circuit according to the present invention. As shown in FIG. 3, the preferred embodiment of the read circuit includes a control signal generating unit 10 that receives a radio frequency signal RFSUM, which is detected from a disc or the like, and outputs a first and a second control signals RFOUT, LPFO to an external circuit (not shown) such as a servo. The control signal generating unit 10 also outputs first and second output signals DOUT, EQOUT. A level compensating unit 20 feeds back a level compensation control signal LCOUT to the control signal generating unit 10. The level compensation control signal LCOUT is based on the comparison of the first output signal DOUT from the control signal generating unit 10 and an offset signal OFFSET. A gain compensating unit 30 receives the second output signal EQOUT from the control signal generating unit 10 to feed back a gain compensation control signal GCOUT to the control signal generating unit 10 to compensate a gain of the control signal generating unit 10. A timing control unit 40 receives the second output signal EQOUT from the control signal generating unit 10 and feeds back a timing control signal SCLK to the control signal generating unit 10.

The control signal generating unit 10 includes an automatic gain controller (AGC) 11 a low pass filter (LPF) 12, an analog/digital converter (ADC) 13 and an equalizer 14. The AGC 11 adjusts the radio frequency signal RFSUM based on the level compensation control signal LCOUT and the gain compensation control signal GCOUT to output the first control signal RFOUT at a prescribed level. The lowpass filter (LPF) 12 outputs the second control signal LPFO by reducing a bandwidth of the first control signal RFOUT below half of that of the timing control signal SCLK. The AD converter (ADC) 13 converts the second control signal LPFO to the first output signal DOUT, which is a digital signal. The equalizer 14 receives the first output signal DOUT and compensates radio frequency attenuation element by being controlled by the timing control signal SCLK and an external input coefficient K.

The level compensating unit 20 includes a comparator 21 and a capacitor 22. The level compensating unit 20 compares the offset signal OFFSET with the first output signal DOUT from the control signal generating unit 10. The capacitor 22 is coupled between an output terminal of the comparator 21 and ground.

The gain compensating unit 30 includes a peak value detector 31, a comparator 32 and a capacitor 33. The peak value detector 31 detects a peak value of the second output signal EQOUT from the control signal generating unit 10. The comparator 32 compares an output signal from the peak value detector 31 with a predetermined reference value PEAK to output the gain compensation control signal GCOUT to the AGC 11 of the control signal generating unit 10. The capacitor 33 is coupled between an output terminal of the comparator 32 and the ground.

The timing control unit 40 includes a timing detector 41, a low pass filter (LPF) 42 and a voltage controlled oscillator (VCO) 43. The timing control unit 40 detects a phase of the second output signal EQOUT. The low-pass filter (LPF) 42 converts an output signal PU/PD from the timing detector 41 to an output voltage. The voltage control oscillator (VCO) 43 converts the output voltage from the LPF 42 to the timing control signal SCLK and outputs the timing control signal SCLK to the control signal generating unit 10.

Operations of the preferred embodiment of the read circuit according to the present invention will now be described. The preferred embodiment of the read circuit can be used for a disc player or the like.

In a pickup unit (not shown) of a disc player or the like, an optical signal is reflected from a disc in which data are recorded preferably by scanning laser beams onto the disc. The reflected optical signal is reflected to the pickup unit (not shown) and converted to an electrical signal by a photo sensor (not shown). When the photo sensor is divided, for example, into 4 sections, each of output signals from the sections is amplified by a preamp (not shown). Then, a high frequency signal RFSUM in which the amplified signals are summed or superimposed is inputted to the AGC 11 of the control signal generating unit 10, and the automatic gain control unit 10 amplifies the radio frequency signal RFSUM to output the signal RFOUT at the prescribed level to the LPF 12.

The output signal RFOUT from the AGC 11 and the output signal LPFO from the LPP 12 are preferably supplied to a servo (not shown) for tracking and focusing operations to prevent signal spectrums from being superimposed in a sampling operation. The LPF 12 reduces the bandwidth of the output signal RFPOUT from the AGC 11 below half of the timing control signal SCLK.

The ADC 13 converts the output signal LPFO from the LPF 12 to the digital signal DOUT by sampling the signal LPFO in accordance with the timing control signal SCLK. The equalizer 14 receives the digital signal DOUT from the ADC 13 and compensates an attenuated radio frequency element of the radio frequency signal RFSUM. The equalizer 14 is preferably an adaptive FIR filter composed of a digital circuit and adaptively varies an initial coefficient data signal K to have an optimum filter characteristic.

The comparator 21 of the level compensating unit 20 compares the offset signal OFFSET, which is a predetermined reference value, with the output signal DOUT from the ADC 13. At this time, when the offset signal OFFSET level is greater than a level of the output signal DOUT from ADC 13, a mid value of the output signal RFOUT from the AGC is increased. When the offset signal OFFSET is smaller than the mid value of the output signal RFOUT, the mid valve of the output signal DOUT is decreased. For example, when the output signal DOUT from the ADC 13 swings from 0 to 63 within a band, offsets are generated in the AGC 11 and the ADC 13 by which the swings are eliminated and a mid value of the output signal DOUT becomes 32.

When the peak value detector 31 of the gain compensating unit 30 detects the peak value of the output signal EQOUT from the equalizer 14, the comparator 32 compares the detected peak value with the predetermined reference value PEAK. When the reference value PEAK is larger than the detected peak value, the gain of the AGC 11 is increased. When the reference value PEAK is smaller, the gain of the AGC 11 is decreased. Accordingly, when amplifying the radio frequency signal RFSUM and supplying the output signal RFOUT, the AGC 11 preferably outputs the signal RFOUT at the constant prescribed level to maintain a peak value of a swing band of the output signal EQOUT of the equalizer 14 to be a predetermined level. Each of the comparators 21, 32 is preferably composed of a digital comparator, and the capacitors 22, 33 that are respectively coupled with the comparators 21, 32 are used for stabilizing the corresponding negative feedback loop.

The timing detector 41, the LPF 42 and the VCO 43 of the timing control unit 40 constitute a PLL loop and apply the timing control signal SCLK to the ADC 13 and the equalizer 14. The timing detector 41 of the timing control unit 40 detects that the phase of the output signal EQOUT from the equalizer 14 is fast or slow. The timing detector 41 outputs the control signal PU/PD for phase-up or phase-down of the output signal EQOUT from the equalizer 14 so that the ADC 13 can be accurately sampled with a peak value of the output signal LPFO from the LPF 12. The LPF 42 of the timing control unit 40 outputs a voltage proportional to the output signal PU/PD from the timing detector 41. Accordingly, the VCO 43 controlled by the output voltage from the LPF 42 maintains a predetermined oscillation frequency, for example 240 MHz, by controlling the speed of the oscillation frequency and thus varies operation frequencies and phases of the ADC 13 and the equalizer 14. Accordingly, the ADC 13 and the equalizer 14 can perform an accurate operation.

As described above, the preferred embodiment of a read circuit has various advantages. The preferred embodiment of the read circuit according to the present invention reduces the power consumption using the adaptive FIR digital equalizer 40 and is applicable to a high-speed data recovery apparatus. Further, the related art read circuit has to be redesigned whenever the data recovery speed increases, but the equalizer applied to the present invention can be continually used by only increasing a clock signal speed.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A read circuit for a reproducer, comprising:
   a control signal generator that receives an input signal and outputs first and second output signals, wherein the control signal generator comprises an adaptive equalizer that receives the first output signal;
   a level compensator that receives the first output signal and feeds back an offset level compensation control signal to the control signal generator to compensate the input signal;
   a gain compensator that receives the second output signal from the control signal generator and feeds back a power gain compensation control signal to the control signal generator to compensate the input signal; and
   a timing controller that receives the second output signal from the control signal generator and feeds back an input sampling control signal to the control signal generator, wherein the equalizer operates at a variable speed based on the timing control signal.

2. The circuit of claim 1, wherein the control signal generator comprises:
   an automatic gain controller that receives the input signal, the offset level compensation control signal from the level compensator and the gain compensation control signal to output a first control signal having prescribed characteristics;
   a low-pass filter that outputs a second control signal by reducing a bandwidth of the first control signal below that of the input sampling control signal; and
   an analog-to-digital converter (ADC) that converts the second control signal to the first output digital signal,
   wherein the equalizer that receives the first output signal from the ADC and outputs the second output signal, wherein the equalizer is controlled by the input sampling control signal and an input coefficient data.

3. The circuit of claim 2, wherein the equalizer is an adaptive FIR filter, wherein the equalizer compensates the second output signal for an attenuated radio frequency element in the input signal, and wherein the first control signal prescribed characteristics include a prescribed peak power and a prescribed mid-point voltage level.

4. The circuit of claim 2, wherein the input signal is a radio frequency signal is detected from a disc, and wherein the automatic gain controller includes an amplifier having a first input terminal that receives the input signal, a second input terminal that receives the offset level compensation control signal, a control terminal that receives the gain compensation control signal and an output terminal that outputs the first control signal.

5. The circuit of claim 1, wherein the control signal generator outputs first and second control signals to an external circuit to control tracking and focusing operations.

6. The circuit of claim 1, wherein the level compensator comprises:
   a comparator that compares an offset signal with the first output signal from the control signal generator; and
   a capacitor coupled between an output terminal of the comparator and a prescribed voltage.

7. The circuit of claim 1, wherein the gain compensator comprises:
   a peak value detector that detects a peak value of the second output signal from the control signal generating unit;
   a comparator that compares an output signal from the peak value detector with a predetermined reference value to output the power gain compensation control signal to an automatic gain controller of the control signal generator; and
   a capacitor coupled between an output terminal of the comparator and a prescribed voltage.

8. The circuit of claim 1, wherein the gain compensation control signal controls magnitude of the power gain of an automatic gain controller of the control signal generator in accordance with the offset level compensation control signal and the gain compensation control signal to prevent swings and offsets in the first and second output signals.

9. The circuit of claim 1, wherein the timing controller comprises:
   a timing detector that detects a phase of the second output signal of the control signal generator;
   a low-pass filter that converts an output signal from the timing detector to an output voltage; and
   a voltage control oscillator that converts the output voltage from the low pass filter to the timing control signal and outputs the timing control signal to the control signal generator.

10. The circuit of claim 1, wherein the timing control signal is a control signal that varies operation frequencies and phases of the ADC and the equalizer of the control signal generator.

11. A read circuit for a disc player, comprising:
    a control signal generating unit that receives an input signal and outputs first and second control signals and first and second output signals;
    a level compensating unit that receives the first output signal and feeds back an input offset signal to the control signal generating unit to compensate the input signal;

a gain compensating unit that receives the second output signal from the control signal generating unit and feeds back an input gain control signal to the control signal generating unit to compensate the input signal; and a timing control unit that receives the second output signal from the control signal generating unit and feeds back a sampling signal to the control signal generating unit, wherein the control signal generating unit comprises:

an automatic gain controller that compares the input signal and the input offset signal from the level compensating unit to output the first control signal having a prescribed bandwidth based on the input gain control signal, a low-pass filter that outputs the second control signal by reducing the bandwidth of the first control signal below that of the sampling signal, an analog-to-digital converter (ADC) that converts the second control signal to the first output digital signal, and an equalizer that receives the first output signal from the ADC and outputs the second output signal, wherein the equalizer operates at a variable speed based on the sampling signal, and wherein the equalizer is controlled by an input coefficient data.

12. The circuit of claim 11, wherein the equalizer is an adaptive FIR filter, and wherein the equalizer compensates the second output signal for an attenuated radio frequency element in the input signal.

13. The circuit of claim 11, wherein the input signal is a radio frequency signal is detected from a disc.

14. The circuit of claim 11, wherein the control signal generating unit outputs the first and second control signals to an external circuit to control tracking and focusing operations.

15. The circuit of claim 11, wherein the level compensating unit comprises:

a comparator that compares an offset signal with the first output signal from the control signal generating unit; and a capacitor coupled between an output terminal of the comparator and a prescribed voltage.

16. The circuit of claim 11, wherein the gain compensating unit comprises:

a peak value detector that detects a peak value of the second output signal from the control signal generating unit;

a comparator that compares an output signal from the peak value detector with a predetermined reference value to output the input gain control signal to the automatic gain controller of the control signal generating unit; and a capacitor coupled between an output terminal of the comparator and a prescribed voltage, wherein the input gain control signal controls magnitude of the gain of the automatic gain controller of the control signal generating unit in accordance with the input offset signal and the input gain control signal to prevent swings and offsets in the first and second output signals.

17. The circuit of claim 11, wherein the timing control unit comprises:

a timing detector that detects a phase of the second output signal of the control signal generating unit;

a low-pass filter that converts an output signal from the timing detector to an output voltage; and a voltage control oscillator that converts the output voltage from the low pass filter to the sampling signal and outputs the sampling signal to the control signal generating unit to vary operation frequencies and phases of the ADC and the equalizer.

* * * * *